(12) United States Patent
Tsukamoto et al.

(10) Patent No.: US 7,166,388 B2
(45) Date of Patent: Jan. 23, 2007

(54) BRAZED CERAMIC SEAL FOR BATTERIES

(75) Inventors: Hisashi Tsukamoto, Saugus, CA (US); Clay Kishiyama, Burbank, CA (US); Andrew Szyszkowski, Canyon Country, CA (US); Douglas Alan Ruth, II, Pleasant Grove, UT (US)

(73) Assignee: Quallion LLC, Sylmar, CA (US)

( * ) Notice: Subject to any disclaimer, the term of this patent is extended or adjusted under 35 U.S.C. 154(b) by 627 days.

(21) Appl. No.: 10/430,036

(22) Filed: May 5, 2003

(65) Prior Publication Data

US 2003/0203279 A1    Oct. 30, 2003

Related U.S. Application Data

(63) Continuation-in-part of application No. 10/222,283, filed on Aug. 15, 2002, now Pat. No. 7,041,413, which is a continuation-in-part of application No. 09/774,450, filed on Jan. 30, 2001, now Pat. No. 6,607,843, and a continuation-in-part of application No. 09/842,790, filed on Apr. 25, 2001, now Pat. No. 6,605,382.

(60) Provisional application No. 60/179,764, filed on Feb. 20, 2000, provisional application No. 60/199,893, filed on Apr. 26, 2000.

(51) Int. Cl.
*H01M 2/04* (2006.01)
*H01M 2/08* (2006.01)
*B32B 15/04* (2006.01)

(52) U.S. Cl. .................... 429/175; 429/164; 429/176; 429/185; 220/600; 220/612

(58) Field of Classification Search ................ None
See application file for complete search history.

(56) References Cited

U.S. PATENT DOCUMENTS

| 2,572,071 A | 10/1951 | St. Clair et al. |
| 2,582,973 A | 1/1952 | Ellis |
| 2,585,922 A | 2/1952 | Ellis |
| 2,768,229 A | 10/1956 | Herbert |
| 3,791,868 A | 2/1974 | Compton et al. |
| 3,826,685 A | 7/1974 | Dubin et al. |

(Continued)

FOREIGN PATENT DOCUMENTS

EP    0 235 504 A1    9/1987

(Continued)

OTHER PUBLICATIONS

Article 34 Amendment as filed on Nov. 9, 2001 in relation to Application No. PCT/US01/13398.

(Continued)

*Primary Examiner*—John S. Maples
(74) *Attorney, Agent, or Firm*—Gavrilovich Dodd & Lindsey

(57) ABSTRACT

This invention is a sealed battery case and a method for making it, including a brazed ceramic ring that separates the positive and negative ends of the battery while providing a leak-tight seal. A brazing material is used that comprises greater than 50% gold. The case is strong, and can be negative, neutral, or positive, withstanding more than 3.5 V vs. $Li/Li^+$.

28 Claims, 2 Drawing Sheets

U.S. PATENT DOCUMENTS

| | | | |
|---|---|---|---|
| 3,985,576 A | 10/1976 | Lingscheit et al. | |
| 4,053,687 A | 10/1977 | Coibion et al. | |
| 4,158,721 A | 6/1979 | Decker et al. | |
| 4,167,413 A | 9/1979 | Christ et al. | |
| 4,170,694 A | 10/1979 | Chase et al. | |
| 4,180,700 A | 12/1979 | Kraska et al. | |
| 4,215,466 A | 8/1980 | Bindin | |
| 4,217,137 A | 8/1980 | Kraska et al. | |
| 4,234,668 A * | 11/1980 | Park et al. ............. | 429/163 |
| 4,288,843 A | 9/1981 | Schroeder | |
| 4,294,897 A | 10/1981 | Bindin | |
| 4,375,127 A | 3/1983 | Elkins et al. | |
| 4,722,137 A | 2/1988 | Ellenberger | |
| 4,940,858 A | 7/1990 | Taylor et al. | |
| 5,053,294 A | 10/1991 | Sernka et al. | |
| 5,134,044 A | 7/1992 | Megerle | |
| 5,194,337 A | 3/1993 | Yoshida et al. | |
| 5,279,909 A | 1/1994 | Horner et al. | |
| 5,320,915 A | 6/1994 | Ali et al. | |
| RE34,819 E | 1/1995 | Mizuhara | |
| 5,411,818 A | 5/1995 | Barlow et al. | |
| 5,578,394 A | 11/1996 | Oweis et al. | |
| 5,789,068 A | 8/1998 | King et al. | |
| 6,040,086 A | 3/2000 | Yoshida et al. | |
| 6,042,625 A | 3/2000 | Daio et al. | |
| 6,114,059 A | 9/2000 | Watanabe et al. | |
| 6,139,986 A | 10/2000 | Kurokawa et al. | |
| 6,197,074 B1 | 3/2001 | Satou et al. | |
| 6,219,224 B1 | 4/2001 | Honda | |
| 6,245,457 B1 | 6/2001 | Romero | |
| 6,245,464 B1 | 6/2001 | Spillman et al. | |
| 6,258,485 B1 | 7/2001 | Kitoh | |
| 6,280,873 B1 | 8/2001 | Tsukamoto | |
| 6,319,628 B1 | 11/2001 | Zama | |
| 6,335,117 B1 | 1/2002 | Yoshida et al. | |
| 6,379,840 B2 | 4/2002 | Kitoh et al. | |
| 6,521,350 B2 | 2/2003 | Fey et al. | |
| 2001/0046625 A1 | 11/2001 | Ruth, II et al. | |
| 2001/0053476 A1 | 12/2001 | Ruth et al. | |
| 2002/0142216 A1 | 10/2002 | Skoumpris | |

FOREIGN PATENT DOCUMENTS

| | | |
|---|---|---|
| EP | 0 989 623 A1 | 3/2000 |
| EP | 1 246 275 A2 | 10/2002 |
| JP | 59-012557 | 1/1984 |
| JP | 01073750 A2 | 3/1989 |
| JP | 1239958 A2 | 9/1989 |
| JP | 01253941 A2 | 10/1989 |
| JP | 05-060241 | 3/1993 |
| JP | 6036795 A2 | 2/1994 |
| JP | 10-012270 | 1/1998 |
| JP | 11186423 A2 | 7/1999 |
| JP | 11-224660 A | 8/1999 |
| JP | 11-250934 A2 | 9/1999 |
| JP | 2000-036324 | 2/2000 |
| JP | 2000-058033 A2 | 2/2000 |
| JP | 2000068396 A2 | 3/2000 |
| JP | 2000100474 A2 | 4/2000 |
| JP | 2000311666 A2 | 11/2000 |
| JP | 2000323105 A2 | 11/2000 |
| JP | 2001052759 A2 | 2/2001 |
| JP | 2001297745 A | 10/2001 |
| WO | WO 01/82397 A1 | 11/2001 |
| WO | WO 02/078113 A1 | 10/2002 |
| WO | WO 02/102589 A1 | 12/2002 |
| WO | WO 02/102590 A1 | 12/2002 |

OTHER PUBLICATIONS

Written Opinion, dated May 20, 2002, as received in relation to Application No. PCT/US01/13398.

Reply to Written Opinion as filed on Jun. 18, 2002 in relation to Application No. PCT/US01/13398.

International Preliminary Examination Report, dated Aug. 5, 2002, as received in relation to Application No. PCT/US01/13398.

* cited by examiner

US 7,166,388 B2

BRAZED CERAMIC SEAL FOR BATTERIES

REFERENCE TO PRIOR FILED APPLICATIONS

This application is a Continuation-in-Part of application Ser. No. 10/222,283, filed Aug. 15, 2002 now U.S. Pat. No. 7,041,413, which is a Continuation-in-Part of application Ser. No. 09/774,450, filed Jan. 30, 2001 now U.S. Pat. No. 6,607843, which claims priority to U.S. provisional application 60/179,764, filed Feb. 20, 2000; and is a Continuation-in-Part of application Ser. No. 09/842,790, filed Apr. 25, 2001 now U.S. Pat. No. 6,605,382, which claims priority to U.S. provisional application 60/199,893, filed Apr. 26, 2000, the entirety of each of which is hereby incorporated herein by reference.

TECHNICAL FIELD

This invention relates to brazed ceramic seals for use in electrochemical storage batteries.

BACKGROUND

A chemical battery case may act to prevent the positive and negative output devices from coming into contact, i.e., shorting. The battery case in its entirety also functions to contain and prevent leakage of battery materials such as an electrolyte. Moreover, the battery case itself must provide for mechanical strength to contain pressures originating from within the battery as well as to provide the mechanical strength for ordinary handling of the battery.

SUMMARY

The invention includes a brazed ceramic ring that separates the positive and negative ends of the battery while providing a leak-tight seal. The ceramic preferably comprises alumina, zirconia, tetragonal zirconia, stabilized-zirconia, partially-stabilized zirconia, yttria-stabilized zirconia, magnesia-stabilized zirconia, ceria-stabilized zirconia, calcia-stabilized zirconia, and titania. The invention includes a brazing material that is greater than 50% gold, and preferably greater than 70% gold. The invention includes a case, which may be at a positive or negative potential or neutral. The material of the case is chosen to withstand this potential without corroding. The battery preferably employs a lithium battery chemistry, but is not so limited, and may alternatively employ other chemistries such as other alkali metal chemistries. As used herein, the terms "lithium batteries" and "lithium battery chemistries" include lithium ion batteries and lithium ion chemistries, respectively. For a negatively charged case, materials that have the requisite ability and corrosion resistance to be used as a negative element, such as a nickel, stainless, or commercially pure (CP) titanium, may be used. For a positively charged case, aluminum and certain alloys such as Ti-6Al-4V have the requisite ability and corrosion resistance to be used as a positive current carrying element where the battery's positive electrode exhibits more than 3.5 V vs. $Li/Li^+$. Alternatively, the case may comprise stainless steel or other materials capable of withstanding even greater potentials, such as greater than 4.1 V vs. $Li/Li^+$, and more preferably, greater than 4.3 V vs. $Li/Li^+$.

DETAILED DESCRIPTION

The following description is of the best mode presently contemplated for carrying out the invention. This description is not to be taken in a limiting sense, but is merely made for the purpose of describing the general principles of the invention. The scope of the invention should be determined with reference to the claims.

Figure 1:
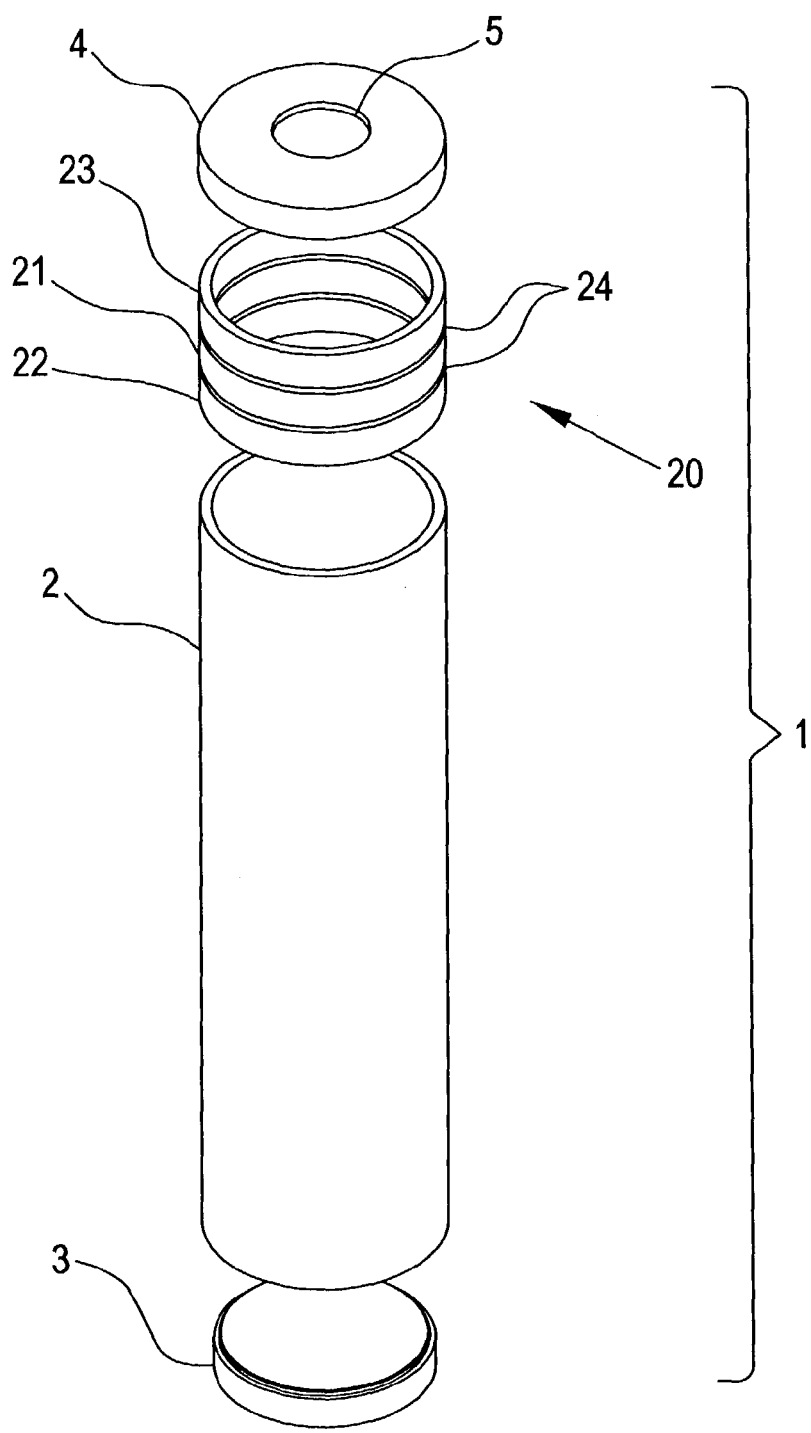
FIG. 1 shows a battery case having a case body, end caps, and a ceramic ring sandwich of the present invention.

A battery case 1, as shown in FIG. 1, provides for mechanical strength to contain pressures originating from within the battery as well as to provide the mechanical strength for ordinary handling of the battery. Titanium and its alloys, such as Ti-6Al-4V, which is principally titanium with 6% aluminum and 4% vanadium, with oxygen, nitrogen, carbon, hydrogen, and iron typically present as trace elements, have the desirable properties of titanium such as high strength for a relatively low weight. Battery case 1 may have a positively charged, negatively charged, or neutral case body 2, and a lid end cap 4 that is at a different potential from case body 2. The materials for the various portions of battery case 1 are chosen to withstand their respective potentials without corroding. Commercially pure (CP) titanium has the requisite ability and electro-activity to be used as a negative current carrying element; Ti-6Al-4V has the requisite ability and electro-activity to be used as a positive current carrying element where the battery's positive electrode exhibits more than 3.5 V vs. $Li/Li^+$. Alternatively, the case may comprise stainless steel or other materials capable of withstanding even greater potentials, such as greater than 4.1 V vs. $Li/Li^+$, and more preferably, greater than 4.3 V vs. $Li/Li^+$, which may correspond to a battery voltage of greater than 3.6 V. A body end cap 3, which seals the bottom of the case body 2, comprises a material that is also chosen according to its potential.

Figure 2:
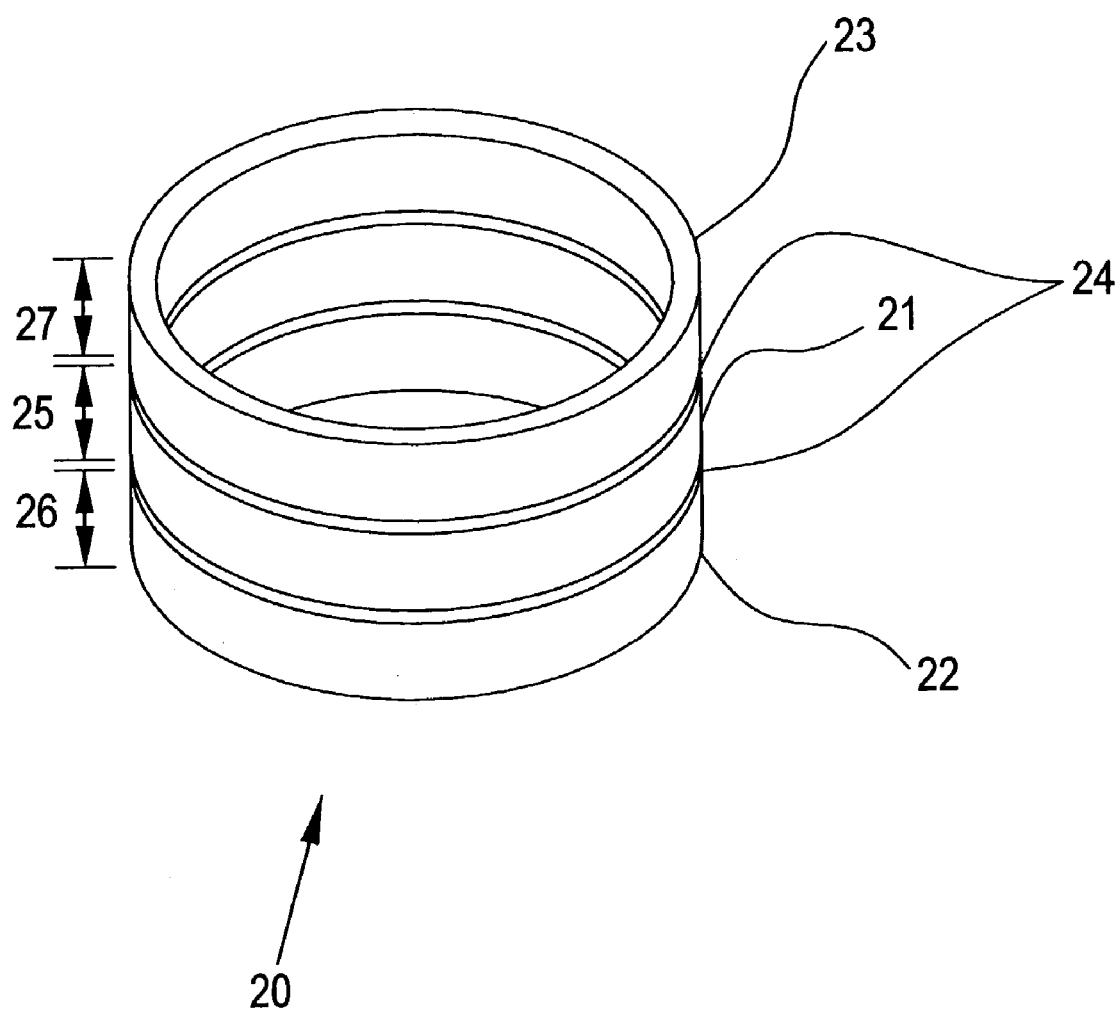
FIG. 2 shows the ceramic ring sandwich with a ceramic ring between metal rings, and a gold-based braze between the ceramic ring and the metal rings.

A ceramic ring sandwich 20 is shown in FIGS. 1 and 2. First looking at FIG. 2, the ceramic ring 21 is brazed by the gold alloy braze 24 to two rings 22 and 23, the materials of which are chosen according to their potential. For a case body 2 that is positively charged, the case body 2, body end cap 3, and ring 22 comprise materials that can withstand a positive potential, such as Ti-6Al-4V, Al, or stainless steel (SS); and ring 23 comprises materials that can withstand a negative potential, such as SS, Cu, CP titanium, alloys thereof, Fe, Ni-plated Fe, Ni, and certain alloys thereof. For a case body 2 that is negatively charged, the case body 2, end cap 3, and ring 22 comprise materials that can withstand a negative potential, such as CP titanium, Cu, Fe, Ni-plated Fe, Ni, and SS; and ring 23 comprises materials that can withstand a positive potential, such as Al, SS, and certain titanium alloys, including Ti-6Al-4V and Ti-3Al-2.5V.

The gold alloy braze 24 is one that contains more than 50% gold by weight, and preferably more than 70% gold by weight. A specific type of gold alloy braze 24 is 96.4% gold, 3.0% nickel, and 0.6% titanium. Some trace elements may be present with a corresponding slight adjustment in the composition percentages. Like all of the materials of the battery case, the braze is chosen so that it can stand up to the electrochemical conditions inside the battery with which it will come in contact. The ceramic ring 21 preferably comprises aluminum oxide (alumina), zirconium oxide (zirconia), zirconium oxide with 3% yttrium (yttria-stabilized zirconia), titania, stabilized-zirconia, partially-stabilized zirconia, tetragonal zirconia, magnesia-stabilized zirconia, ceria-stabilized zirconia, and calcia-stabilized zirconia.

Returning to FIG. 1, the ceramic ring sandwich 20 is placed on the open end of the case body 2 with ring 22 toward the case body 2. Ring 22 is then laser welded to the case body 2. Subsequently, a lid end cap 4, comprising a material chosen according to its potential, is welded, preferably laser welded, to ring 23 of the ceramic ring sandwich 20.

The thicknesses 25, 26, and 27 of the ceramic and metal rings are preferably greater than 1 mm to facilitate welding and prevent shorting.

Methods of assembly for the ceramic ring sandwich 20 include brazing together a sheet of ceramic material between a sheet of titanium and titanium alloy Ti-6Al-4V and then laser cutting a shape to fit the end of a given battery case. The sandwich can be cut into almost any desired geometrical shape. Another method is cutting out the ceramic ring 21 and the titanium alloy Ti-6Al-4V ring 22 and the titanium ring 23 separately and brazing the pieces together.

Typically, once the ceramic sandwich 20 is welded to the case body 2, the battery electrodes (not shown) can be inserted into the case body 2 and a feedthrough (not shown) inserted through a hole 5 formed in the lid end cap 4. Alternatively, the lid end cap 4 may not have a hole formed therein and may itself serve as the opposite terminal without the use of a feedthrough, as described in copending application Ser. No. 10/222,283. The feedthrough (not shown) is welded shut to provide a leak-tight seal. The battery 1 is filled with electrolyte (not shown) and laser welded closed on the body end cap 3. Tabs (not shown), which are connected to the positive electrode (not shown), can be folded out of the case and laser welded at the same time as the body end cap 3, as described in applications Ser. Nos. 09/842,790 and 10/222,283.

While the invention herein disclosed has been described by means of specific embodiments and applications thereof, numerous modifications and variations could be made thereto by those skilled in the art without departing from the scope of the invention set forth in the claims. For example, while the invention has been illustrated for a circular cylindrical case body and circular end caps, metal rings, and ceramic rings, it can be appreciated that the case body, end caps, and rings may be noncircular, and that manufacturing methods described herein lend themselves to other shapes. Furthermore, while the case body 2 has been described as having a body end cap 3 welded to seal it, in fact, the case body may be deep drawn with an integral bottom, or the body end cap 3 may be sealed to the case body 2 using other means known in the art.

We claim:

1. A battery comprising:
   a battery case including
      a first ring that includes a ceramic material,
      a second ring sealed to the first ring, the second ring including a first metal and being bonded to an open end of a cylinder, and
      a third ring sealed to the first ring, the third ring being bonded to a cap for the battery case
   electrodes housed in the battery ease such that the cylinder surrounds the electrodes; and
   an electrolyte activating the electrodes in the battery case.

2. The battery of claim 1, wherein the battery case includes a positive current carrying element of the battery.

3. The battery of claim 2, wherein the positive current carrying clement exhibits more than 3.5 V vs. Li/Li$^+$.

4. The battery of claim 2, wherein the positive current carrying element exhibits more than 4.1 V vs. Li/Li$^+$.

5. The battery of claim 2, wherein the positive current carrying element exhibits more than 4.3 V vs. Li/Li$^+$.

6. The battery of claim 1, wherein the battery is a lithium battery.

7. The battery of claim 1, wherein the end cap is negatively charged.

8. The battery of claim 1, wherein the cylinder has a closed end.

9. The battery of claim 1, wherein the cap includes a feedthrough hole.

10. The battery of claim 1, wherein the second ring is bonded to the open end of the cylinder such that a lower edge the second ring is on top of an upper edge of the cylinder.

11. The battery of claim 1, wherein the third ring is bonded to the cap such that the cap is on top of an upper edge of the cylinder.

12. The battery of claim 1, wherein the first ring is positioned between the second ring and the third ring.

13. The battery of claim 1, wherein a lower edge of the third ring is on top of an upper edge of the first ring and a lower edge of the first ring is on an upper edge of the second ring.

14. The battery of claim 1, wherein a gold alloy braze seals the second ring to the first ring, the gold alloy braze being more than 50 wt/% gold.

15. The battery case of claim 14, wherein the gold alloy braze has a gold content of more than 70 wt %.

16. The battery case of claim 15, wherein the gold alloy braze includes 96.4% gold, 3.0% nickel, and 0.6% titanium.

17. The battery of claim 1, wherein a gold alloy braze seals the third ring to the first ring, the gold alloy braze being more than 50 wt % gold.

18. The battery case of claim 17, wherein the gold alloy braze has a gold content of more than b 70 wt/%.

19. The battery case of claim 17, wherein the gold alloy braze includes 96.4% gold, 3.0% nickel, and 0.6% titanium.

20. The battery of claim 1, wherein a weld attaches the third ring to the cylinder.

21. The battery of claim 1, wherein the ceramic material is selected from the group consisting of: alumina, zirconia, tetragonal zirconia, stabilized-zirconia, partially-stabilized zirconia, yttria-stabilized zirconia, magnesia-stabilized zirconia, acne-stabilized zirconia, calcia-stabilized zirconia, and titania.

22. The battery case of claim 1, wherein the cylinder and the second ring include the same metal.

23. The battery case of claim 1, wherein the end cap and the third ring include the same metal.

24. The battery of claim 1, wherein the second ring includes a material chosen from the group consisting of titanium and alloys thereof.

25. The battery of claim 1, wherein the third ring includes a material chosen from the group consisting of titanium and alloys thereof.

26. The battery of claim 1, wherein
   the cylinder has a closed end;
   the cap includes a feedthrough hole;
   the first ring is positioned between the second ring and the third ring such that a lower edge of the third ring is on top of an upper edge of the first ring and a lower edge of the first ring is on an upper edge of the second ring;

the second ring is bonded to the open end of the cylinder such that a lower edge the second ring is on top of an upper edge of the cylinder;

the third ring is bonded to the cap such that the cap is on upper edge of the cylinder; and a weld attaches the third ring to the cylinder.

27. The battery of claim 26, wherein gold alloy brazes seal the second ring to the first ring and the third ring to the first ring the gold alloy brazes being more than 50 wt % gold;

the ceramic material is selected from the group consisting of: alumina, zirconia, tetragonal zirconia, stabilized-zirconia, partially-stabilized zirconia, yttria-stabilized zirconia, magnesia-stabilized zirconia, ceria-stabilized zirconia, calcia-stabilized zirconia, and titania;

the second ring and the third ring each include a material chosen from the group consisting of titanium and alloys thereof.

28. The battery of claim 1, wherein gold alloy brazes seal the second ring to the first ring and the third ring to the first ring, the gold alloy brazes being more than 50 wt % gold;

the ceramic material is selected from the group consisting of: alumina, zirconia, tetragonal zirconia, stabilized-zirconia, partially-stabilized zirconia, yttria-stabilized zirconia, magnesia-stabilized zirconia, ceria-stabilized zirconia, calcia-stabilized zirconia, and titania;

the second ring and the third ring each include a material chosen from the group consisting of titanium and alloys thereof.

* * * * *